United States Patent [19]
Motoda et al.

[11] 3,809,988
[45] May 7, 1974

[54] AUTOMATIC LOAD WEIGHT BALANCING SYSTEM

[75] Inventors: Kenro Motoda, Tokyo; Kensuke Hasegawa, Yokohama, both of Japan

[73] Assignee: Motoda Electronics Co., Inc., Tokyo, Japan

[22] Filed: Aug. 16, 1973

[21] Appl. No.: 388,967

[30] Foreign Application Priority Data
Aug. 21, 1972 Japan.............................. 47-82861

[52] U.S. Cl.................. 318/646, 318/609, 318/663, 318/673
[51] Int. Cl. .......................................... G05b 11/28
[58] Field of Search .......... 318/646, 673, 663, 609, 318/626; 192/.02 R

[56] References Cited
UNITED STATES PATENTS

| | | | |
|---|---|---|---|
| 3,020,458 | 2/1962 | Morgan | 318/609 |
| 3,150,304 | 9/1964 | Armstrong et al. | 192/.02 R |
| 3,369,161 | 2/1968 | Kaufman | 318/626 X |

Primary Examiner—B. Dobeck
Attorney, Agent, or Firm—Cushman, Darby & Cushman

[57] ABSTRACT

An automatic load weight balancing system includes an automatic balancing signal generating section comprising a clutch directly or indirectly coupled to a drive shaft, a triple position signal element having a suitable dead zone and proportional plus integral element for receiving as an input an output signal of the triple position signal element. An automatic balancing signal from the automatic balancing signal generating section is fed back to a control amplifier for controlling a driving section such as an electric motor, a hydraulic motor etc. to reduce a difference between the weight of a load and a driving force of the driving section to substantially zero, thereby automatically stopping the load in any position.

15 Claims, 8 Drawing Figures

AUTOMATIC LOAD WEIGHT BALANCING SYSTEM

This invention relates to an automatic load weight balancing system for automatically balancing the weight of a load and the driving force of a driving section of a device for moving the load up and down.

In a device for moving a load up and down by controlling a driving torque of a torque motor such as an electric motor, a hydraulic motor etc. using a control signal generated dependent upon the operating angle of an operating lever, the operating lever is manually operated to move the load to a desired position and, upon release of the lever, returned to a neutral position normally under the influence of a spring. Therefore, a balance between the weight of the load and the driving force is broken and it is impossible to stop the load in the desired position. Suppose that the lever is maintained in any desired position upon release of the lever. Even if a balance is so attained between the weight of the load and a driving torque, a balance is broken due to the variation of the characteristics of the associated parts or due to the variation of the weight of the load, and the load begins to be moved from its "stopped" position. Such devices are very difficult to handle. Therefore, the control for automatically balancing the weight of the load and the driving force is required from practical viewpoints, for example, from the consideration of safety, easiness of use etc. Such automatic balancing control is particularly required at a production plant or factory, for example, in positioning brittle, weighty articles or fitting together high accuracy articles or parts. After the load is moved, there often happen the cases where an operator releases the lever to undertake a work associated with said operation or to take tools.

Furthermore, such a capability is often required as to manually apply upward and downward forces to a load, without operating the lever, to break a balance between the weight of the load and the driving force so that the load can be easily lifted and lowered.

An object of this invention is to provide an automatic load weight balancing system capable of automatically holding a load in a stopped position once attained, irrespective of the variation of the weight of the load or the variation of the characteristics of a driving section.

Another object of this invention is to provide an automatic load weight balancing system capable of manually applying upward and downward forces to a load, as required, so that the load can be easily lifted or lowered.

This invention can be more fully understood from the following detailed description when taken in connection with reference to the accompanying drawings, in which.

Figure 1:
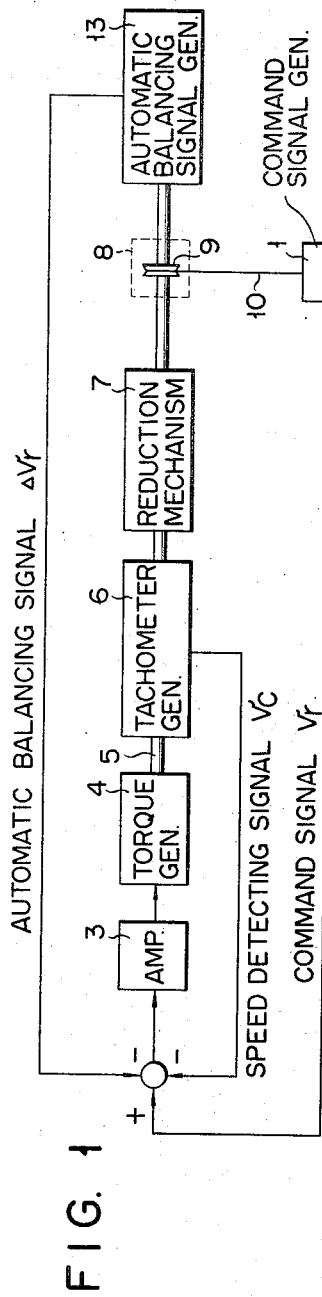
FIG. 1 is a systematic representation showing an automatic load weight balancing system according to one embodiment of this invention.

In FIG. 1 the reference numeral 1 shows command signal generating means provided with an operating lever 2. When the operating lever 2 is operated by an operator to give any operating angle $\theta$, a command signal or a reference signal Vr is obtained. The command signal Vr is fed to an amplifier 3. The amplified output of the amplifier is supplied to a driving torque generating means 4 including an electric motor, hydraulic motor etc. to cause a torque motor to initiate its rotation. A driving shaft 5 of the torque motor is coupled to a tachometer generator 6 for generating a speed detecting signal in proportion to the rotational speed of the torque motor. The speed detecting signal Vc is negatively fed back to the input of the amplifier 3. A driving torque from the torque generating means 4 is supplied through a speed reduction mechanism 7 to a motion transforming mechanism 8. The motion transforming mechanism 8 is equipped with, for example, a drum 9 around which a wire 10 is wound. At the end of the wire 10 is provided the command signal generating means 1 under which a grip 11 for suspending a load 12 is mounted.

When the degree of amplification of the amplifier 3 is sufficiently high, a feedback control system for tending to cause Vc to be substantially equal to Vr is created. As a result, the load can be lifted or lowered at a speed substantially proportional to the operating angle $\theta$ of the operating lever 2.

Figure 2:
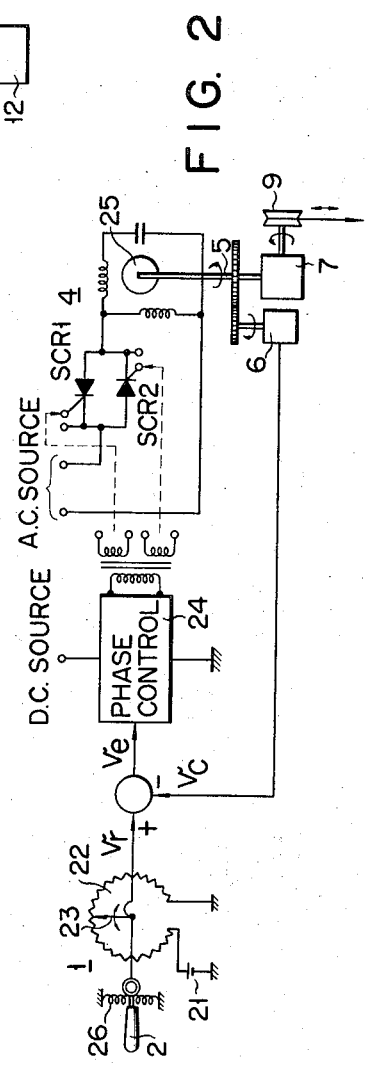
FIG. 2 is a detailed construction of such a fundamental automatic control system for lifting or lowering a load, as included in FIG. 1.

FIG. 2 shows the detail of the above-mentioned feedback speed control system. As shown in FIG. 2 the command signal generating means 1 includes a D.C. power source 21 and a potentiometer 22 and is so arranged that a control signal Vr proportional to an operating angle of the lever 2 is taken out by the operating lever 2 coupled to a slider 23 of the potentiometer. The operating lever 2 is so constructed that it is brought into a neutral position when released by a spring means 26. A difference or error Ve between a control signal Vr and a speed detection signal Vc from a tachometer generator 6 is fed to, for example, a known phase control circuit 24 including unijunction transistors. The firing angles of silicon controlled rectifiers SCR1 and SCR2 are varied by the outputs of a phase control circuit 24, and the lifting and lowering speeds of the load 12 are controlled by varying effective voltages applied to a torque motor or an induction motor 25.

Figure 3:
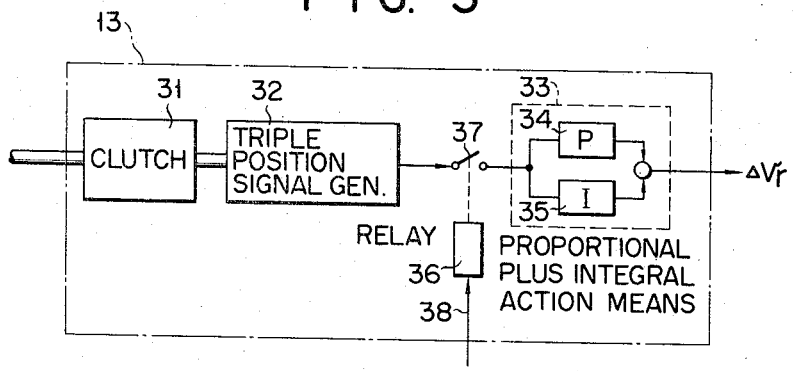
FIG. 3 is a systematic representation of an automatic balancing signal generating section of FIG. 1.

In FIG. 1 an automatic balancing signal generating means 13 constituting a featuring aspect of this invention is directly or indirectly coupled to a driving shaft 5 of the torque motor. An automatic balancing signal $\Delta Vr$ from the automatic balancing signal generating means 13 is negatively fed back to the input of the amplifier 3. As shown in FIG. 3 the automatic balancing signal generating means 13 has a clutch 31, a triple position signal generating means 32 and a proportional plus integral action means 33 including a proportional action section 34 and an integral action section 35. In addition, a relay 36 for receipt of an energizing signal from the outside and a normally closed relay contact 37 are also provided, as required.

Figure 4:
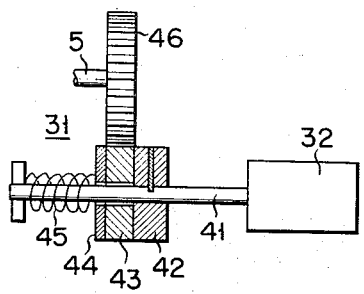
FIG. 4 is a view showing one example of a clutch section in FIG. 3.

The clutch 31 utilizing a static friction is so arranged that, when more than preset torques are applied to a rotational shaft, the contact surfaces of the clutch are slid, thereby causing a drive shaft to be idly rotated. One example is shown in FIG. 4. As shown in FIG. 4 a disc plate 42 is secured to a rotational shaft 41 coupled to the triple position signal generating means 32. Adjacent to the disc plate there is provided a gear 43 freely rotatable around the shaft 41. A disc plate 44 is urged against the gear 43 by means of a spring 45. The gear 43 is engaged with a gear 46 fixed to the drive shaft 5. A static friction is effected between the contact surfaces of the disc plate 42 and the gear 43 and between the contact surfaces of the disc plate 44 and the gear 43. Therefore, the rotational shaft 41 is normally rotated, under the influence of the static friction, in unison with the rotation of the drive shaft 5.

Figure 5:
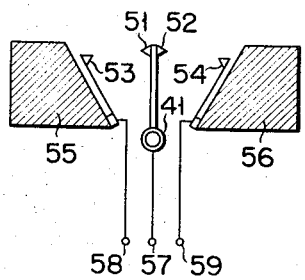
FIG. 5 is a view showing the construction of a triple position signal element capable of being used in association with a clutch of FIG. 4.

FIG. 5 shows one example of a triple position detector included in the triple position signal generating means 32. As shown in the figure, the rotational shaft 41 has contacts 51 and 52 respectively engageable with fixed contacts 53 and 54 when the shaft 41 is rotated in counterclockwise and clockwise directions. When the contact 51 (or 52) is engaged with the fixed contact 53 (or 54), any further rotation of the rotational shaft 41 is restricted by a rotation restricting member 55 (or 56). In this state, the drive shaft 5 is idly rotated due to a sliding movement occurring between the contact surfaces of the clutch.

Figure 6:
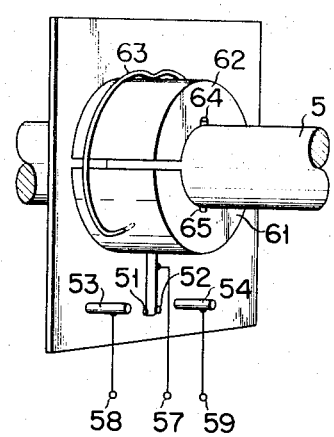
FIG. 6 is a view showing another embodiment of a clutch and a triple position signal element.

FIG. 6 shows another example of the clutch 31. First and second members 61 and 62 are frictionally engaged, by means of a piano wire 63 for example, with a drive shaft 5. When a contact 51 or 52 mounted to the first member 61 is contacted with a fixed contact 53 or 54, a sliding movement occurs between the contact surfaces of the first and second members 61 and 62 and the drive shaft 5, and the first and second members 61 and 62 do not rotate any further. The reference numerals 64 and 65 are pins for preventing the drive shaft from being moved lengthwise of the drive shaft 5. The first and second member may be made of, for example, nylon, teflon etc.

The triple position signal generating means 32 detects, in FIG. 5, a position (1) in which the contact 51 is contacted with the contact 53, a position (2)-hereinafter referred to as a dead zone position-in which the contact 51 or 52 is not contacted with the fixed contact 53 or 54 and a position (3) in which the contact 52 is contacted with the fixed contact 54. $E1$ corresponding to the position (1), 0 to the position (2) and $E2 (E1 > 0 > E2)$ to the position (3) are obtained as output signals using D.C. power sources and the above-mentioned contacts.

The output signal from the triple position signal generating means 32 is impressed through a normally closed relay contact 37 to the proportional plus integral action section 33. Where the rotational shaft 41 of the triple position signal generating means 32 is in the position (2) i.e. dead zone position, the input voltage to the proportional plus intagral action section 33 becomes zero and the output signal from the proportional action section 34 of the proportional plus integral action section 33 becomes zero. On the other hand, the output signal from the integral action section 35 of the proportional plus integral action section 33 attains a predetermined value. Thus, a signal, i.e., an automatic balancing signal $\Delta Vr$, from the proportional plus integral action section 33 attains a predetermined value. When, for some reason, the load 10 begins to be lowered, the rotational shaft 41 of the triple position signal generating means 32 is rotated counterclockwise in interlock with the downward movement of the load to cause the contact 51 to be brought into contact with the fixed contact 53, thus producing the voltage E1. This signal is fed back, as an automatic balancing signal $\Delta Vr$, to the amplifier 3 through the proportional plus integral action section 33. This compensates for an insufficient driving power. When the driving power becomes equal to the weight of the load, the load stops its downward movement. At this time contacts 51 and 53 are still closed and feedback signals continue to be increased with the result that the load 10 starts its upwsrd movement. When the load 10 is moved upwardly, the contact 51 is disengaged from the fixed contact 53 and a signal from the triple position signal generating means 32 becomes zero. Therefore, an automatic balancing signal is momentarily decreased by an amount corresponding to a signal from the proportional action section 34 and occupied only a signal having a constant value from the integral action section 35. If the signal of the constant value is so adjusted as to cause a driving force just the same as the weight of the load to be generated at a driving section 4, the rotational shaft 41 of the triple signal generating means 32 is stopped in the dead zone position and the load 10 is stopped. If the signal of the constant value is of such a magnitude as to cause a driving force smaller than the weight of the load to be generated at the driving section, the rotational shaft 41 is again rotated counterclockwise in FIG. 5 to cause the contact 51 to be brought into contact with the contact 53. At this moment a signal is generated from the porportional action section 34 and added to an automatic balancing signal and the driving section is immediately controlled so as to lift the load. During this portion of the same period signal components of the integral action section 35 are increased. Thus, when the rotational shaft 41 is returned to the dead zone position, an integral signal component can attain a value balancing the weight of the load or a value approximate thereto. This value is not always required to correspond to an exact value owing to a static friction, a coulomb friction etc. The rotational swing of the shaft 41 can be easily adjusted to be stopped about once or twice.

Explanation has been made of the case where the load is lowered. Even when the load is lifted, substantially the same automatic balancing process is followed except for the direction involved.

While the load 10 is lifted or lowered by the operation of the operating lever 2, the rotational shaft 41 of the triple position signal generator 32 is in the position (1) or (3). As a result, a preset signal is fed back to the amplifier 3. The maximum voltage from the potentiometer 22 of the command signal generating means 1 is sufficiently large, no difficulty is presented in raising or lowering the load. When the operating lever is released, the rotational shaft 41 is immediately returned to the dead zone position and the above-mentioned operation is effected, thus balancing the load.

Figure 7:
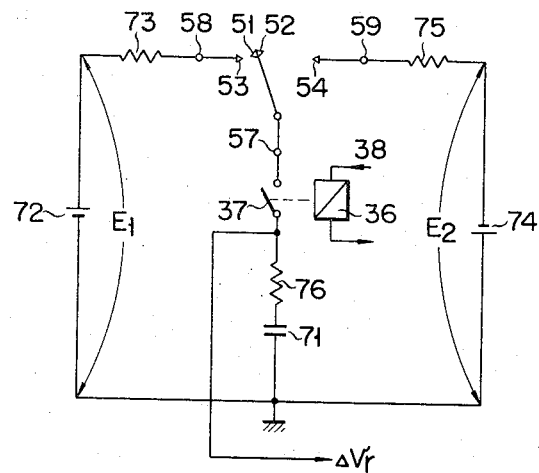
FIG. 7 is a view showing an automatic balance signal generating section including a triple position signal element and a proportional plus integral action section.

FIG. 7 is one example of a circuit arrangement of the triple position signal generating means 32 and proportional plus integral action section 33. A capacitor 71 corresponds to the integral action section 35 of FIG. 3 and is charged through a resistor 73 by a D.C. power source 72 when the contact 51 is brought into contact with the fixed contact 53, resulting in a rise in capacitor voltage. On the other hand, when the contact 52 is brought into contact with the fixed contact 54 the capacitor 71 is charged, in a reverse direction, through a resistor 75 by a D.C. power source 74, resulting in a drop in capacitor voltage. When either of the contacts is not closed, capacitor voltage attains a preset value. A resistor 76 corresponds to the proportional action section 34 and generates a voltage proportional to a current flow prevalent when the contact is brought into contact with the fixed contact. Therefore, a voltage at the point 57 substantially corresponds to an output signal of the proportional plus integral action section.

Let it be assumed that an input resistance of the amplifier 3 is small. When the rotational shaft 41 is in the dead zone position a voltage across the capacitor 71 is discharged through the input resistance of the amplifier 3 and it is impossible to maintain a constant voltage. Therefore, it is necessary to sufficiently increase the input resistance of the amplifier 3.

After the load is automatically balanced and stopped as mentioned above, there are some cases where it is preferred that the load be manually moved up and down without operating the operating lever 2. In such case, it is only necessary that an external signal 38 be supplied to the relay 36 shown in FIGS. 3 and 7 in an attempt to open the contact 37. In the balanced state, the integral action section 35 or a capacitor 71 stores a value corresponding to a driving force of the driving section for cancelling the weight of the load. When attempt is made not to vary the stored value through the opening of the relay contact 37 even if the contact 51 (or 52) is brought into contact with the fixed contact 53 (or 54) as a result of the rotation of the shaft 41, then the operator can manually move the load up and down with easiness by applying to the load 10 a force sufficient to exceed the static friction and coulomb friction of the driving section 4 and motion transforming section 8 to thereby break a balance between the driving force and the weight of the load.

Figure 8:
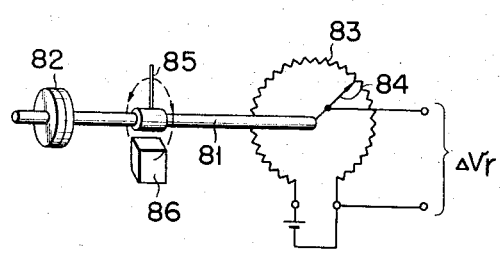
FIG. 8 is a diagrammatic illustration embodiment of an automatic balance signal generating section including a clutch and potentiometer.

A potentiometer may be used to obtain the balancing signal. In this case, a rotational shaft 81 connected to a clutch 82 similar to the clutch 31 is coupled to a slider 84 of a potentiometer 83 as shown in FIG. 8. To restrict the rotation of the shaft 81 a pin 85 is mounted to the shaft 81 and a restricting member 86 for engaging the pin to restrict the rotation of the shaft 81 is also provided. The slider 84 of the potentiometer 83 is incessantly moved during the control of the upward and downward movement of the load and during the automatic balancing control. Therefore, there is a fear that the resistance wire of the potentiometer is severed and it will necessary that a resistance wire having a lengthy service life be used. For example, a potentiometer of continuous type, not wound type, using an electroconductive organic material is particularly suitable as a resistance wire.

What we claim is:

1. An automatic load weight balancing system adapted to be used together with a feedback speed control system designed to control the speed of the upward and downward movement of a load and including control signal generating means, a control amplifier means for receiving a control signal, and drive means having a torque motor for generating in response to the output of the amplifier means a driving force for moving the load up and down and adapted to reduce a difference between the driving force and weight of the load to zero, or a value approximate thereto, so as to automatically stop the load at any position, said automatic load weight balancing system including:
   clutch means coupled directly or indirectly to a drive shaft or said driving section and utilizing a static friction;
   clutch rotation restricting means adapted to rotate said clutch means through a predetermined angle in interlock with the rotation of the drive shaft utilizing the static friction and to block the rotation of the clutch means at other than the predetermined angle;
   automatic balancing signal generating means coupled to said clutch means and adapted to generate an automatic balancing signal in response to the rotational position of the clutch; and
   means for feeding the automatic balancing signal back to said control amplifier means.

2. An automatic load weight balancing system according to claim 1 in which said automatic balancing signal generating means includes a rotational shaft adapted to be rotated by the drive shaft; contact means mounted to said rotational shaft; a first fixed contact means located to be engaged with the contact means when the rotational shaft is rotated, in one direction, through said predetermined angle; a second fixed contact means located to be engaged with the contact means when the rotational shaft is rotated, in the other direction, through said predetermined angle; proportional plus integral action means coupled to said contact means mounted to said rotational shaft and adapted to generate an automatic balancing signal; and power source means for permitting said proportional plus integral action means to generate a different voltage at the output of said proportional plus integral action means dependent upon whether said contact means is in a first position in which it is brought into contact with said first fixed contact means, or in a second position in which it is brought into contact with said second fixed contact means, or in a third position in which it is not engaged with either of the first and second fixed contact means.

3. An automatic load weight balancing system according to claim 2 in which said clutch means includes a plate fixed to said rotational shaft, a first gear rotatably disposed on said rotational shaft and adjacent to said plate to permit it to be frictionally engaged with said plate, and a second gear disposed in mesh with said first gear and adapted to be rotated with the drive shaft.

4. An automatic load weight balancing system according to claim 1 in which said automatic balancing signal generating means includes a rotational shaft to be rotated by the drive shaft; a potentiometer having a slider coupled to said rotational shaft and a resistance body.

5. An automatic load weight balancing system according to claim 1 in which said clutch means includes at least one member engaged with the drive shaft or a rotational shaft rotated in interlock with the drive shaft and means for causing a static friction between said member and the drive shaft or rotational shaft and supporting the member; and in which said automatic balancing signal generating means is coupled to said member.

6. An automatic load weight balancing system according to claim 5 in which said automatic balancing signal generating means includes contact means mounted to said member; a first fixed contact means located to be engaged with said contact means when said member is rotated, in one direction, through a predetermined angle together with the drive shaft or the rotational shaft; a second fixed contact means located to be engaged with said contact means when said member is rotated, in the other direction, through a predetermined angle together with the drive shaft or the rotational shaft; a proportional plus integral action means coupled to the contact means and adapted to generate an automatic balancing signal; and a power source means for permitting said porportional plus integral action means to generate a different voltage dependent upon whether said contact means is in a first position in which it is brought into contact with said first fixed contact means, or in a second position in which it is brought into contact with said second fixed contact means, or in a third position in which it is not engaged with either of said first and second fixed contact means.

7. An automatic load weight balancing system according to claim 2 in which said proportional plus integral action means includes a combination of a capacitor and a resistor.

8. An automatic load weight balancing system according to claim 6 in which said proportional plus integral action means includes a combination of a capacitor and a resistor.

9. An automatic load weight balancing system according to claim 2 further comprising means for interrupting a connection between said proportional plus integral action means and said contact means mounted on the rotational shaft.

10. An automatic load weight balancing system according to claim 9 in which said interrupting means includes a relay having a normally closed relay contact connected between said contact means and said proportional plus integral action means, and a coil energized by an external control signal to permit said relay contact to be opened.

11. An automatic load weight balancing system according to claim 6 further comprising means for interrupting a connection between said proportional plus integral action means and said contact means mounted on the shaft.

12. An automatic load weight balancing system according to claim 11 in which said interrupting means includes a relay having a normally closed relay contact connected between said contact means and said proportional plus integral action means, and a coil energized by an external control signal to permit the relay contact to be opened.

13. An automatic load weight balancing system according to claim 1 in which said load is suspended by a grip means provided under said control signal generating means.

14. An automatic load weight balancing system according to claim 13 in which said control signal generating means includes an operating lever and a potentiometer having a slider coupled to said operating lever and a resistance body.

15. An automatic load weight balancing system according to claim 14 further comprising a spring means for returning said lever to a neutral position when said lever is released.

* * * * *

UNITED STATES PATENT OFFICE
CERTIFICATE OF CORRECTION

Patent No. 3,809,988          Dated May 7, 1974

Inventor(s) Kenro MOTODA et al

It is certified that error appears in the above-identified patent and that said Letters Patent are hereby corrected as shown below:

Priority document:

"Japanese Application 82862/72 filed August 21, 1972"

Signed and sealed this 12th day of November 1974.

(SEAL)
Attest:

McCOY M. GIBSON JR.
Attesting Officer

C. MARSHALL DANN
Commissioner of Patents